Sept. 5, 1933.  E. J. KOCOUR  1,925,390
VALVE
Filed April 10, 1929
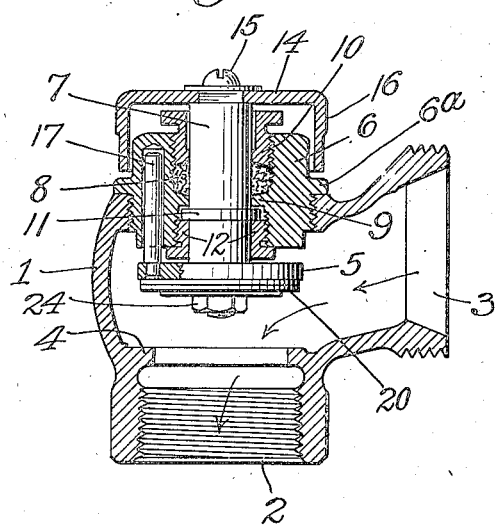
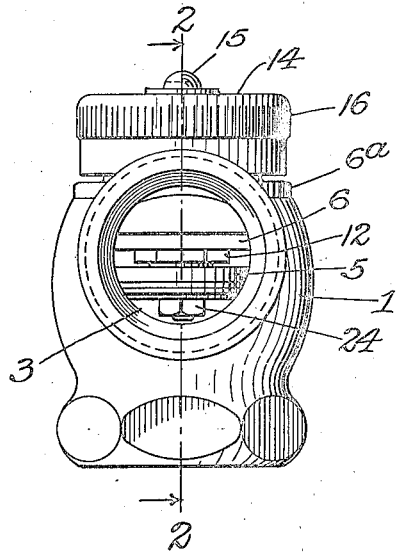
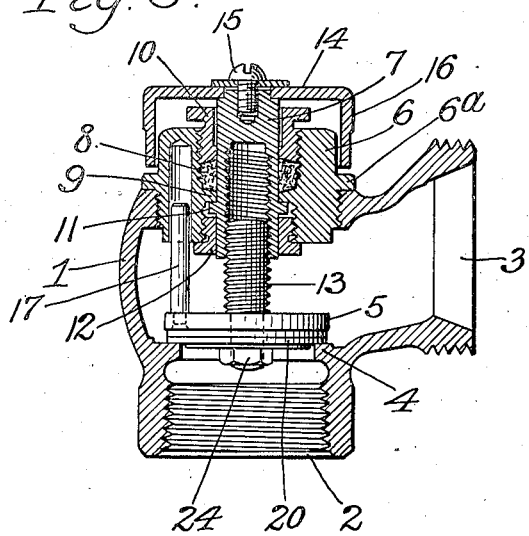
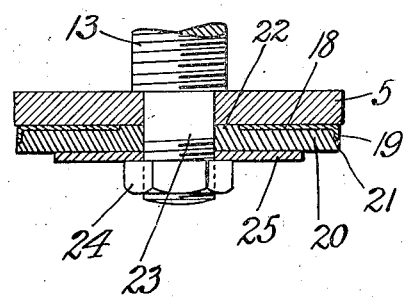
Inventor
Emil J. Kocour
by Parker & Carter
Attorneys.

Patented Sept. 5, 1933

1,925,390

UNITED STATES PATENT OFFICE 1,925,390

VALVE

Emil J. Kocour, Chicago, Ill., assignor to Sloan Valve Company, Chicago, Ill., a corporation of Illinois Application April 10, 1929. Serial No. 353,933

2 Claims. (Cl. 251—48)

This invention relates to improvements in valves and has for its object to provide a new and improved device of this description.

The invention has as a further object to provide a valve which shall be small and compact and still have a large free waterway and which may act either as a shut off or as a throttling flow regulator.

The invention has as a further object to provide a valve which may be used in connection with flush valves in the pipe leading thereto and which shall be easily accessible for cleaning and repairing.

The invention has other objects which are more particularly pointed out in the accompanying description.

One form embodying the invention is illustrated in the drawing wherein Fig. 1 is an exterior view of the valve.

Fig. 2 is a sectional view therethrough taken on line 2—2 of Fig. 1.

Fig. 3 is a view similar to Fig. 2 showing the closing member in its closed position.

Fig. 4 is an enlarged view in part section showing the construction of the closing member.

Like numerals refer to like parts throughout the several figures.

Referring now to the drawing, I have shown a valve comprising a casing 1 having the inlet and outlet openings 2 and 3. The casing is provided with a seat 4 for the closing member 5. A plug 6 is connected with the casing 1 preferably by being screw threaded therein. A hollow stem 7 for the closing member 5 is rotatably connected with this plug and passes through the packing 8 which is compressed between the ring 9 on the plug and the adjustable packing gland member 10 threaded into the plug. The stem 7 is provided with a projection 11 which engages the ring 9 on the plug so as to hold the stem against removal.

A nut 12 is inserted in the plug so as to hold the stem against removal in the opposite direction. The stem 7 is provided with a threaded opening into which is received the threaded projection or member 13 on the closing piece 5. A hand wheel 14 is connected with the stem 7 in any desired manner, as by means of the screw 15. This hand wheel has an angularly disposed rim 16 which forms substantially a continuation of the body. It will be seen that this hand wheel surrounds the stem and the packing nut and hexagonal end of the projecting plug 6. The wheel rim is cylindrical. This gives a good appearance and makes it unnecessary to finish or polish these parts which are covered. The plug 6 is provided with a stop ring 6a which limits its inward movement. The hand wheel is preferably knurled as shown.

The closing piece 5 has connected therewith a pin 17 which slides in an opening in the plug 6 and it will be noted that this pin lies outside of the waterway so as not to interfere with the passage of the water through the valve. The closing part, as herein shown, consists of a seat plate having attached thereto a thin, metal disk 18 with a flanged rim 19. There is a soft rubber seating piece 20 vulcanized or molded into this metal disk and having a projecting ledge 21 which projects beneath the flanged rim 19. The metal disk 18 is provided with a hole 22 and the rubber has also a central hole smaller than the hole in the disk and giving a close contact with the threaded holding member 23. The fact that the rubber extends a small amount below and across the flange of the disk provides a full yielding surface to contact with the valve seat. The threaded piece 23 may be a threaded part working in a threaded hole in the seat plate and may be provided with a head 24. A metal washer 25 is preferably located between the head 24 and the rubber disk 20.

It will be seen that by this construction, the closing member, valve stem, pin 17, the plug 6 and packing members may be all assembled outside the valve and then quickly and easily placed in position by screwing in the plug 6. The hand wheel may then be placed in position.

It will also be seen that this makes it easy to remove the parts and clean them. It will further be noted that in the operation of the device, the hand wheel is not lifted and lowered but remains in the same position, the closing member 5 moving up and down when the wheel is turned.

I claim:—

1. A valve comprising a casing, a plug removably connected with said casing, a stem rotatably mounted in said plug provided with an internal screw threaded opening, a threaded member working in said opening, a packing for said stem, a closing member connected with said threaded member, a pin connected with the said closing member, said plug being provided with an opening at one side of said packing closed at its upper end, said pin projecting into said opening and sliding therein as the closing member is raised and lowered.

2. A valve comprising a casing, a seat therein, a movable closing member in said casing, said closing member comprising a seat plate, a metal disc having an enlarged central opening, and a flanged rim, a rubber seating member in said disc having a central portion which projects into the central opening therein so as to be in the plane of the disc, said rubber seating member projecting beyond and across the said flanged rim, the portion of said rubber seating member which projects across said flanged rim engaging the seat, and means for fastening the parts together.

EMIL J. KOCOUR.